United States Patent [19]
Kawata et al.

[11] 4,191,051
[45] Mar. 4, 1980

[54] ENGINE IDLING SPEED CONTROL SIGNAL GENERATOR

[75] Inventors: Shoji Kawata, Okazaki; Naoji Sakakibara, Chiryu, both of Japan

[73] Assignees: Aisin Seiki Kabushiki Kaisha, Kariya; Toyota Jidosha Kogyo Kabushiki Kaisha, Toyota, both of Japan

[21] Appl. No.: 924,321

[22] Filed: Jul. 13, 1978

[30] Foreign Application Priority Data

Jul. 20, 1977 [JP] Japan .................................. 52/86787

[51] Int. Cl.[2] .............................................. G01K 13/00
[52] U.S. Cl. ........................................ 73/347; 123/102
[58] Field of Search .................................. 73/346–348, 73/362 R, 362 AR, 362 SC, 346, 347, 118; 123/41.13, 97 R, 102, 140 J, 179 L, 32 EG

[56] References Cited

U.S. PATENT DOCUMENTS 2,965,091 12/1960 Munyan ........................... 123/179 L
3,964,457 6/1976 Coscia ........................... 123/179 L X

FOREIGN PATENT DOCUMENTS 2223966 12/1973 Fed. Rep. of Germany ........ 123/140 J

*Primary Examiner*—Jerry W. Myracle
*Attorney, Agent, or Firm*—Sughrue, Rothwell, Mion, Zinn and Macpeak

[57] ABSTRACT

The idle speed of an engine is controlled in response to a control signal derived from the voltage across a thermistor responsive to the temperature of the engine cooling water. The thermistor voltage level varies exponentially with temperature changes. An engine idle speed control signal generator circuit includes a network of resistors, diodes and a transistor which produces an output control signal whose maximum level is limited to a value corresponding to a desired maximum idle speed, and whose minimum level is maintained above a value corresponding to the minimum desired idling speed. The circuit also adjusts the level of the output control signal to compensate for varying engine loads and faults in the circuit.

8 Claims, 3 Drawing Figures

ENGINE IDLING SPEED CONTROL SIGNAL GENERATOR

BACKGROUND OF THE INVENTION

The invention relates to a speed indication signal generator circuit which generates a speed command signal for controlling an engine on an automative vehicle to a desired actual speed; more particularly the invention relates to a speed indication signal generator circuit which generates an idling speed command signal for controlling an engine on an automative vehicle to an desired idling actual speed in response to the temperature of the cooling water in the engine.

Hitherto, a speed indication signal generator circuit was employed for generating a target speed signal for controlling the actual rotational speed of the engine on the automative vehicle, more particularly, for generating a target idling speed signal for controlling the actual idling rotational speed of the engine to a predetermined one in response to the temperature of the cooling water in the engine. Generally speaking, the generator circuit comprises a thermistor which detects the temperature of the cooling water in the engine. The resistance of the thermistor changes in response to the change of the temperature of the cooling water, whereby a voltage which corresponds to the temperature of the cooling water is obtained across the thermistor. Thus a speed indication signal which represents a desirable engine speed corresponding to the temperature of the cooling water is generated in the generator circuit on the basis of the voltage across the thermistor. However, the resistance of the thermistor changes exponentially with respect to the change of the temperature of the cooling water. Therefore the variation range of the voltage across the thermistor is very wide as compared with the normal variation range of the temperature of the cooling water. Thus the engine is not suitably controlled with the voltage across the thermistor, because the voltage at some temperatures of the cooling water represents an unreal engine speed. Also the voltage across the thermistor represents an abnormal engine speed when the thermistor is disconnected or short-circuited, which causes an abnormal rise or fall of the engine speed.

SUMMARY OF THE INVENTION

Accordingly, it is an object of the invention to provide an improved speed indication signal generator circuit for controlling the rotational speed of the engine in response to the temperature of the cooling water in the engine.

It is another object of the invention to provide a speed indication signal generator circuit generating a speed indication signal having upper and lower limit voltage levels suitable for the actual control of the engine in response to the temperature of the cooling water in the engine.

Still another object of the invention is to provide a speed indication signal generator circuit generating a speed indication signal which represents a higher target engine speed during an increased load on the engine.

A further object of the invention is to provide a speed indication signal generator circuit generating a speed indication signal which represents a higher target engine speed at an increase of the load of the engine.

An additional object of the invention is to provide a speed indication signal generator circuit generating a speed indication signal which represents a higher target engine speed at the starting of the engine.

According to the invention, the speed indication signal generator circuit comprises a thermometer circuit including a thermal sensor such as a thermistor responsive to the temperature of the cooling water; a first cut-off bias circuit shifting the output signal level of the thermometer circuit below a predetermined upper limit level which corresponds to a first predetermined actual rotational speed limit of the engine; and a second cut-off bias circuit shifting the output signal level of the thermometer circuit above a predetermined lower limit level which corresponds to a second predetermined actual rotational speed limit of the engine. When the output voltage level of the thermometer relates to the target engine speed in a positive sense (namely, increase of the output voltage of the thermometer indicates acceleration of the engine), the first predetermined actual rotational speed limit corresponds to a predetermined higher actual rotational speed limit and the second predetermined actual rotational speed corresponds to a predetermined lower actual rotational speed limit. In another embodiment of the invention, the speed indication signal generator circuit comprises further a third cut-off bias circuit shifting the output signal level of the thermometer circuit above a predetermined intermediate limit level between the upper and the lower limit levels during an increased load on the engine; a first instantaneous bias circuit shifting momentarily the output signal level of the thermometer circuit to accelerate the engine in response to the increase of the load of the engine; and a second instantaneous bias circuit shifting momentarily the output signal level of the thermometer circuit to increase the target engine speed in response to the starting of the engine.

DESCRIPTION OF PREFERRED EMBODIMENT

Figure 1:
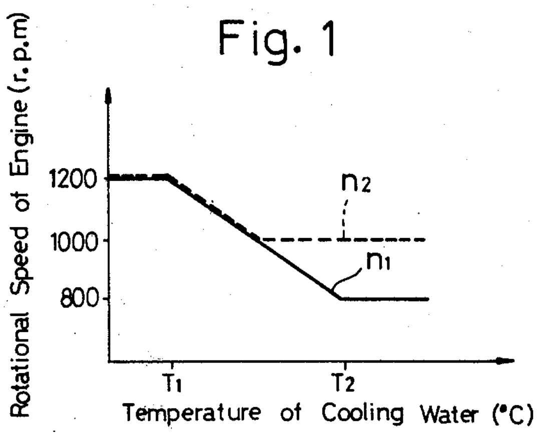
FIG. 1 is a graph showing a relationship between the temperature of the cooling water in an engine and the desirable rotational speed of the engine.
Figure 2:
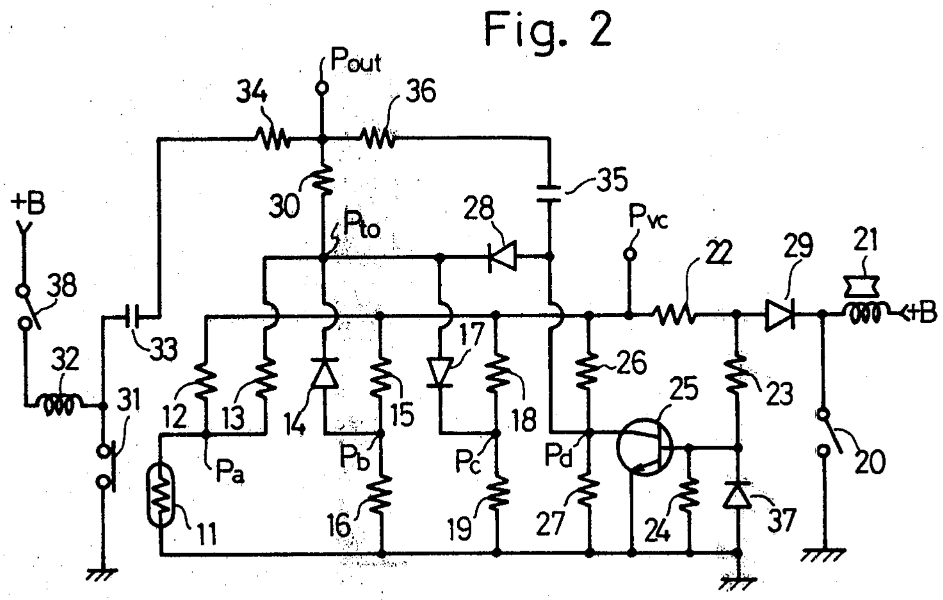
FIG. 2 is a circuit diagram showing a preferred embodiment of the invention.
Figure 3:
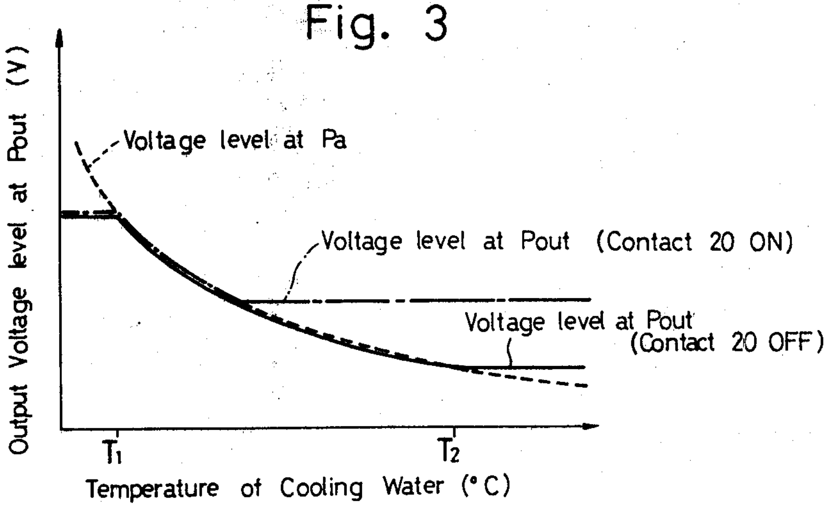
FIG. 3 is a graph showing the output voltage level of the circuit shown in FIG. 2 in relation to the temperature of the cooling water in the engine.

A desirable idling rotational speed of an engine is shown in FIG. 1, in which the speed is constant 1200 (r.p.m.) under a predetermined lower temperature of $T_1$ of the cooling water of the engine, constant 800 (r.p.m.) over a predetermined upper temperature $T_2$ of the cooling water, and nearly inversely proportional to the change of the temperature between $T_1$ and $T_2$ as shown by a solid line $n_1$. Further, the speed should be over 1000 (r.p.m.) as shown by a dotted line $n_2$ when a load such as a car air conditioner is connected to the engine. The embodiment shown in FIG. 2 is designed so as to generate a speed indication signal employed for controlling the speed of the engine as shown in FIG. 2. The speed indication signal generator circuit in FIG. 2 comprises a thermometer circuit including a negative characteristic thermistor 11 and resistors 12, 13; a first cut-off bias circuit including a diode 17 and resistors 18, 19; a second cut-off bias circuit including a diode 14 and resistors 15, 16; a third cut-off bias circuit including diodes 28, 29, 37, resistors 22, 23, 24, 26, 27 and a NPN transistor 25; a first instanteneous bias circuit including a capacitor 35; and a second instantaneous bias circuit including a capacitor 33. A constant voltage is applied to resistors 12, 15, 18, 26 and 22 through a terminal $P_{vc}$. Resistor 12 and thermistor 11 are serially connected between the terminal $P_{vc}$ and the ground. Thus a voltage indicating the temperature of the cooling water occurs across thermistor 11 (at connection point $P_a$ between thermistor 11 and resistor 12) and applied to an output terminal $P_{to}$ of the thermometer circuit through resistor 13. The voltage at point $P_a$ is shown by a dotted line in FIG. 3. The anode of diode 17 is connected with the output terminal $P_{to}$, and the cathode of diode 17 is connected with the connection point $P_c$ between resistors 18 and 19 which are connected serially between terminal $P_{vc}$ and the ground. The resistances of resistors 18 and 19 are so determined as to generate a predetermined upper voltage at point $P_c$, which corresponds to 1200 (r.p.m.), and cut off the voltage at point $P_{to}$ below the upper voltage. The cathode of diode 14 is connected with the output terminal $P_{to}$ of the thermometer circuit. The anode of diode 14 is connected with the connection point $P_b$ between resistors 15 and 16 which are connected serially between terminal $P_{vc}$ and the ground. The resistances of resistors 15 and 16 are so determined as to generate a predetermined lower voltage at point $P_b$, which corresponds to 800 (r.p.m.), and cut off the voltage at point $P_{to}$ above the lower voltage. The cathode of diode 28 is connected with the output terminal $P_{to}$ of the thermometer circuit. The anode of diode 28 is connected with the connection point $P_d$ between resistors 26 and 27 which are connected serially between terminal $P_{vc}$ and the ground. The resistances of the resistors 26 and 27 are so determined as to generate a predetermined intermediate voltage at point $P_d$, which corresponds to 1000 (r.p.m.), during OFF of transistor 25 and cut off the voltage at point $P_{to}$ above the intermediate voltage. The collector and emitter of transistor 25 are connected with point $P_d$ and the ground respectively. The base of transistor 25 is connected with a terminal of resistor 24, the other terminal of which is connected to the ground. The cathode of diode 37 and a terminal of resistor 23 are connected with the base of transistor 25. The anode of diode 37 is connected to the ground. The other terminal of resistor 23 is connected with a terminal of resistor 22 and the anode of diode 29. The other terminal of resistor 22 is connected with terminal $P_{vc}$. The cathode of diode 29 is connected with a contact 20 and a terminal of a coil of an electromagnetic coupling 21 which connects the car air conditioner with the enginein response to the closure of the contact 20. At the open state of the contact 20, the voltage at the anode of diode 29 is high enough to turn ON transistor 25. Thus transistor 25 shunts resistor 27 and the voltage at point $P_d$ is ground level. Therefore the third cut-off bias circuit including diode 28, 29, 37, resistors 22, 23, 24, 26, 27 and transistor 25 does not lift the voltage at terminal $P_{to}$ above the predetermined intermediate voltage as shown by a solid line in FIG. 3. At the closed state of the contact 20, however, the voltage at the anode of diode 29 is ground level. Therefore transistor 25 is OFF state and the intermediate voltage at point $P_d$, which corresponds to 1000 (r.p.m.), lifts the voltage at the output terminal $P_{to}$ of the thermometer circuit over the intermediate voltage as shown by a phantom line in FIG. 3. At closure of the contact 20, namely at turning OFF of transistor 25, the voltage at point $P_d$ rises and the differential current flows through the capacitor 35 of the first instantaneous bias circuit and resistor 36, whereby the output voltage at the output terminal $P_{out}$ of the speed indication signal generator circuit rises in a moment so as to accelerate the engine in a moment to overcome the increased load on the engine. Resistor 30 is connected between the output terminal $P_{to}$ of the thermometer circuit and the output terminal $P_{out}$ of the speed indication signal generator circuit. An additional resistor 34 is connected between the output terminal $P_{out}$ and the capacitor 33 of the second instantaneous bias circuit. The capacitor 33 is in turn connected with a switch 31 and the starter relay coil 32. The switch 31 is closed at the parking and the neutral positions of the manual shift lever of the automotive vehicle on which the engine is equipped. The starter relay coil 32 is energized through the ignition switch 38 and never energized when the manual shift lever is at the forward or backward driving position because the switch 31 is opened. During the starting of the engine, namely the switch 31 is closed state and the ignition switch 38 is closed, the voltage at the connection point between the starter relay coil and the capacitor 33 rises in a moment at closure of the switch 38. Thus the differential current flows through capacitor 33 and resistor 34, whereby the output voltage at the output terminal $P_{out}$ rises in a moment so as to lift the output voltage at the terminal $P_{out}$ to start the engine with a higher speed. Assuming that the thermistor 11 is disconnected, the output voltage of the thermometer circuit rises up to the constant voltage at the terminal $P_{vc}$ which might drive the engine up to abnormal highest speed. However, the first cut-off circuit including diode 17 and resistors 18, 19 cuts off the output voltage below the predetermined upper voltage level. Assuming that the thermistor 11 is short-circuited, the output voltage of the thermometer circuit is the ground level which might cause stoppage of the engine. However, the second cut-off circuit including diode 14 and resistors 15, 16 cuts off the fall of the output voltage above the predetermined lower voltage level.

As described above, the speed control signal generator circuit of the invention generates a speed control signal having upper and lower limit levels suitable for the actual control of the engine in response to the temperature of the cooling water in the engine. The generator circuit also shifts the speed control signal level to fit with a change of the load on the engine and momentary shifts the speed indication signal level to accelerate the engine at the increase of the load or starting of the engine so as to prevent deceleration or stopage of the engine.

It will be understood that those skilled in the art may make changes and modifications to the foregoing speed indication signal generator circuit without departing from the spirit and scope of the invention as set forth in the claimes appended hereto.

We claim:

1. An engine idle speed control signal generator circuit comprising:

a thermometer circuit including a thermal sensor responsive to the temperature of the cooling water in an engine to produce an output signal level indicative of the temperature;

a first cut-off bias circuit limiting the output signal level of the thermometer circuit below a predetermined upper limit level representing one limit of desired engine idle speed; and a second cut-off bias circuit maintaining the output signal level of the thermometer circuit above a predetermined lower limit level representing the opposite limit of desired engine idle speed.

2. A signal generator circuit as set forth in claim 1 which further comprises a third cut-off bias circuit shifting the output signal level of the thermometer circuit above a predetermined intermediate limit level between the upper and lower limit levels during an increased load on the engine.

3. A signal generator circuit as set forth in claim 2 which further comprises a first instantaneous bias circuit shifting the output signal level of the thermometer circuit in a moment toward an acceleration of the engine when the load on the engine increases.

4. A signal generator circuit as set forth in claim 2 which further comprises a second instantaneous bias circuit shifting the output signal level of the thermometer circuit in a moment toward an increase of the speed of the engine during the starting of the engine.

5. A signal generator circuit as set forth in claim 1 wherein the thermometer circuit comprises a thermistor and two resistors, the thermistor is serially connected with one of the resistors between a constant voltage terminal and the ground, and the other resistor is connected with an output terminal of the thermometer circuit; the first cut-off bias circuit comprises a diode and two resistors, the anode of the diode is connected with the output terminal of the thermometer circuit and the cathode of the diode is connected with the connection point between the two resistors which are serially connected between the constant voltage terminal and the ground; and the second cut-off bias circuit comprises a diode and two resistors, the cathode of the diode is connected with the output terminal of the thermometer circuit and the anode of the diode is connected with the connection point between the two resistors which are serially connected between the constant voltage terminal and the ground.

6. A signal generator circuit as set forth in claim 5 which further comprises a third cut-off circuit comprising at least a diode, two resistors and a transistor, the cathode of the diode is connected with the output terminal of the thermometer circuit, the anode of the diode is connected with the connection point between the two resistors which are serially connected between the constant voltage terminal and the ground, and the transistor is connected to the anode of the diode to connect the anode of the diode to the ground when the transistor is ON state.

7. A signal generator circuit as set forth in claim 6 which further comprises a capacitor and a resistor which are serially connected between an output terminal of the speed indication signal generator circuit and the anode of the diode in the third cut-off bias circuit, the output terminal is connected to the output terminal of the thermometer circuit.

8. A signal generator circuit as set forth in claim 7 which further comprises a capacitor and a resistor which are serially connected between the output terminal of the speed indication signal generator circuit and the ignition relay coil of the engine.

* * * * *